3,297,702
REDUCTION OF LINEAR-TRANS-
QUINACRIDONEQUINONE
Willy Braun, Heidelberg, Wilhelm Ruppel, Mannheim, and Rolf Mecke, Ludwigshafen (Rhine), Germany, assignors to Badische Anilin- & Soda-Fabrik Aktiengesellschaft, Ludwigshafen am (Rhine), Germany
No Drawing. Original application Apr. 4, 1961, Ser. No. 100,496, now Patent No. 3,147,263, dated Sept. 1, 1964. Divided and this application July 9, 1964, Ser. No. 381,534
Claims priority, application Germany, Apr. 8, 1960, B 57,403; Oct. 22, 1960, B 59,826; Nov. 10, 1960, B 60,034
4 Claims. (Cl. 260—279)

This application is a division of our copending application Serial No. 100,496, filed April 4, 1961, now U.S. Patent No. 3,147,263, issued September 1, 1964.

This invention relates to the reduction of linear-trans-quinacridonequinone by the action of reducing metals. Furthermore, the invention relates to reduction products of linear-trans-quinacridonequinone.

It is known from the literature, for example from Belgian patent specifications Nos. 560,543 and 568,930, that 7,14-dioxo-5,7,12,14 - tetrahydroquinolino-[2,3-b] - acridine (linear-trans-quinacridone) can be used as a very fast and clear red pigment. This dye can be produced in various manners. It can be obtained, for example, by the processes described in Belgian patent specifications Nos. 560,542, 560,543 and 575,517 by condensation of a succinylosuccinic acid ester with aniline to form the 2,5-dianilino-3,6-dihydroterephthalic acid ester, ring closure of this ester to give dihydroquinacridone, and dehydrogenation of the latter compound according to the following scheme:

(I)
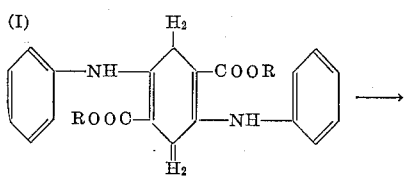

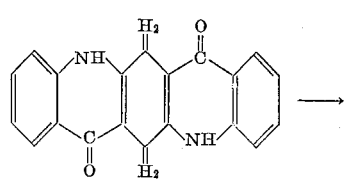

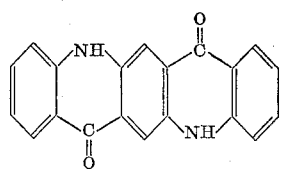

It is, however, also possible, as described by Libermann in "Annalen der Chemie," volume 518, 245 et seq. (1935), to first dehydrogenate the above-mentioned 2,5-dianilino-3,6-dihydroterephthalic acid esters to give the 2,5-dianilinotetrephthalic acid esters and then to convert the latter by ring closure, for example in the manner described in Belgian patent specifications Nos. 579,525 or 579,526, into the quinacridone according to the following scheme:

(II)
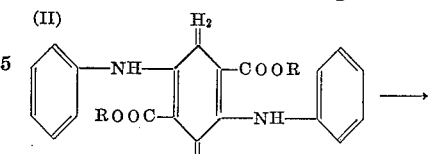

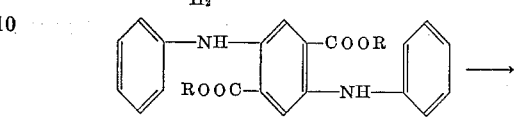

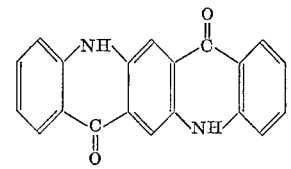

The above processes are, however, unsatisfactory because they are complicated and costly to carry out on an industrial scale.

It is an object of this invention to provide reduction products of linear-trans-quinacridonequinone in a highly economical and practically useful manner. A more specific object of this invention is to provide 7,14-dioxo-5,7,12,14-tetrahydroquinolino - [2,3-b] - acridine (linear-trans-quinacridone).

The objects of this invention are achieved by allowing a finely divided metal such as is usual as a reducing agent to act in the presence of a mineral acid on linear-trans-quinacridonequinone of the formula:

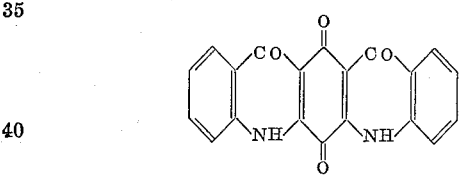

The new process proceeds according to the following scheme:

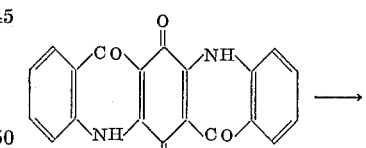

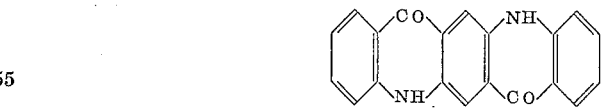

for example at temperatures of between 70° and 260° C., within a period of from 20 minutes to 20 hours depending on the reaction conditions. If necessary, increased pressure is applied during the reaction. If it is desired to carry out the reduction at relatively high temperatures, the temperature range of from 80° to 220° C. is preferred.

If the reduction carried out in accordance with the present invention has passed beyond the stage of linear-trans-quinacridone, an after treatment with an oxidizing agent, preferably with a mild one, is required to obtain linear-trans-quinacridone.

As a rule, 3 to 3.5 moles of finely divided metal are required per mole of quinacridonequinone.

Suitable mineral acids in the presence of which the finely divided metal may be used include aqueous hydrochloric acid, sulfuric acid and phosphoric acid. In general, highly concentrated acids, for example about 70% sulfuric acid, about 70% phosphoric acid or about 2 N hydrochloric acid, are used. Higher concentrations are, however, also suitable. When the process is carried out in the presence of mineral acids, the reduction temperatures may be very low, for example 0° C., but may of course also lie higher, for example in the range of between 0° and 100° C. or above 100° C., e.g. up to 120° C. It is expedient to use 100 to 300 parts of mineral acid per 10 parts of linear-trans-quinacridonequinone. The reducing agent is, as a rule, employed in an amount calculated to reduce the linear-trans-quinacridonequinone to the desired stage. If necessary, the reducing agent may be used in excess for example up to about 20%. In general, the reaction is complete after 1 to 30 hours.

Metals which are commonly used in finely divided form as reducing agents and which are suitable for the process according to this invention include iron, aluminum, nickel and, preferably, zinc, as well as mixtures of these metals. The finely divided metals may be employed in the form of, for example, powders, granules, dust, chips, borings or splinters.

Iron, aluminum and especially zinc, are preferred as reducing metals. By this method, quinacridone or the product preparable by reducing quinacridonequinone one stage further, viz. dihydroquinacridone, can be obtained direct.

Surprisingly, by the process according to the invention linear-trans-quinacridonequinone is reduced by finely divided metals such as are usual as reducing agents, not only to the corresponding hydroquinone, as is the base with other derivatives of p-benzoquinone, but the reduction proceeds further to the stage of benzene without the acridone rings undergoing any change. This could not be forseen because it is known that p-benzoquinone in catalytic hydrogenation affords benzene only at temperatures as high as 220° C., whereas linear-trans-quinacridonequinone under the same conditions is reduced only to the hydroquinone stage.

Reduction in the presence of mineral acids may, for example, be carried out as follows:

Zinc dust or iron powder is allowed to act, at temperatures of between 0° and 100° C., on a suspension of quinacridonequinone in 70% sulfuric acid, linear-trans-quinacridone being obtained in good yield. If, in the presence of an excess of reducing agent, the temperature is raised to above 150° C. and the concentration of the sulfuric acid is increased to such a degree that the quinacridonequinone is dissolved (for example to 80 to 90%), dihydroquinacridone is formed. This compound can be converted into quinacridone by mild oxidizing agents. Suitable oxidizing agents of this kind include sodium m-nitrobenzene sulfonate, sodium polysulfite, atmospheric oxygen or pure oxygen in alcoholic-alkaline solution or ferric sulfate in the presence of acids.

Quinacridone can, however, also be obtained direct at temperatures of between 100° and 140° C. and after short reaction periods by using sulfuric acid of lower concentration (about 70 to 75%) which just dissolves the quinacridonequinone at the prevailing reaction temperature, but dissolves no quinacridone or only negligible amounts thereof.

The products which are obtained when the reduction process is carried out in the presence of mineral acids are separated, if required after diluting the reaction mixture with water, in the usual manner, washed free from acid with water, and dried.

The starting material, linear-trans-quinacridonequinone, can be obtained in a simple manner by condensation of 1 mole of p-benzoquinone with 2 moles of o-aminobenzoic acid and ring closure of the resultant compounds according to the method described in "Berichte der Deutschen Chemischen Gesellschaft," 51, 701 et seq. (1916). The quinacridonequinone used as starting material for reduction in the presence of mineral acids need not be present in isolated form. Thus, quinacridonequinone prepared by heating 2,5-dianthranilobenzoquinone in sulfuric acid can be reduced direct, in the condensation melt, to form linear-trans-quinacridone. The process according to the present invention is, however, not only suitable for the reduction of quinacridonequinone itself, but also for the reduction of its derivatives. The 3,9-halogen and alkyl derivatives, for example, may likewise be used for the new reduction process.

The invention will be further illustrated by, but is not limited to, the following examples. The parts and percentages specified in the examples are by weight.

Example 1

10 parts of zinc dust are introduced at 5 to 10° C., while stirring well, into a suspension of 10 parts of linear-trans-quinacridonequinone in 200 parts of 70% sulfuric acid. The whole is stirred for about 20 hours at room temperature. Then the reaction mixture is slowly heated to 95° to 100° C., and stirring is continued for some hours. After filtration, the residue is freed from excess zinc by boiling it with dilute hydrochloric acid. From the resultant crude product, pure linear-trans-quinacridone is obtained by fractional precipitation from sulfuric acid solution.

Example 2

7 parts of zinc dust are introduced in the course of 30 minutes at 120° C., while stirring, into a solution of 10 parts of quinacridonequinone in 130 parts of 72% sulfuric acid. The temperature is raised to 140° C. in the course of one hour and the whole stirred for 1½ hours at this temperature. The reaction mixture is then cooled and filtrated by suction. The residue is dissolved in 200 parts of 96% sulfuric acid, filtered off from zinc dust and zinc sulfate, and fractionated with about 40 parts of water. Pure linear-trans-quinacridone is obtained in a yield of about 80% of the theoretical amount.

By dilution with water, a further quantity of pure linear-trans-quinacridone is obtained from the filtrate of the reaction solution.

Example 3

By following the procedure described in Example 2, but using the equivalent amount of iron powder instead of zinc dust, pure linear-trans-quinacridone is obtained in a similarly good yield.

Example 4

20 parts of zinc dust are introduced, at 100° C. into a solution of 10 parts of linear-trans-quinacridonequinone in 200 parts of 85% sulfuric acid. The whole is heated to 140° to 150° C. in the course of several hours and maintained at this temperature until starting material can no longer be detected. After cooling, the reaction mixture is poured into ice water, the precipitate filtered off, and the residue freed from zinc by boiling it with dilute mineral acid. The blue-red product yields pure linear-trans-quinacridone on dehydrogenation with mild oxidizing agents, for example on dehydrogenation in alcoholic alkali with sodium m-nitrobenzenesulfonate or in dilute mineral acid with ferric sulfate.

Example 5

A solution of 10 parts of 2,5-dianthranilobenzoquinone-1,4 in 94 parts of 96% sulfuric acid is heated to 170° to 180° C., while stirring. Stirring is continued at this temperature for 30 minutes, and the solution then cooled rapidly to 100° C. 33 parts of water are dripped in slowly, the temperature rising to 120° C. Then 10 parts of zinc dust are added in the course of 30 minutes, and the temperature is raised to 140° C. in the course of one hour. The reaction mixture is stirred for 1½ hours at this temperature, cooled to room temperature, and worked up as described in Example 2. Pure linear-trans-quinacridone is obtained in a yield of about 70% of the threoretical amount.

As can be seen from the foregoing detailed description and examples, the invention relates to an advantageous process for the production of reduction products of linear-trans-quinacridonequinone. More specifically it relates to the production of linear-trans-quinacridone by means of reducing metals which are suitable for use on an industrial scale and which have a reducing action in the presence of mineral acids at temperatures in the range of between about 0° and 260° C. Whereas iron, zinc, and aluminum are preferred as metals of the said kind, mixtures thereof and similar reducing metals are also suitable.

The reaction medium in which the reduction of linear-trans-quinacridonequinone is to be carried out should be strong enough to provide, together with the metal, sufficient reducing action.

Upon knowledge of the present disclosure, it is within the skill of those familiar with chemistry to make use of the process of the present invention and of analogous methods without deviating from the scope of the invention.

We claim:

1. A process for reduction of linear-trans-quinacridonequinone which comprises reducing said linear-trans-quinacridonequinone at a temperature above 0° C. in a concentrated, aqueous, minteral acid solution, said acid selected from the group consisting of sulfuric acid, hydrochloric acid and phosphoric acid, containing a finely divided metal selected from the group consisting of zinc, iron, and aluminum, thereby producing a member selected from the group consisting of linear-trans-quinacridone and linear-trans-dihydroquinacridone.

2. A process as claimed in claim 1 wherein said finely divided metal is finely divided zinc and said mineral acid solution is sulfuric acid solution of at least 70% strength.

3. A process as claimed in claim 1 wherein said finely divided metal is finely divided iron and said mineral acid solution is sulfuric acid solution of at least 70% strength.

4. A process as claimed in claim 1 wherein the temperature of reduction is between 100° C. and 140° C., and the mineral acid is about 70–75% sulfuric acid in an amount which just dissolves the quinacridonequinone at the reaction temperature and dissolves at most negligible amounts of the resultant quinacridone.

References Cited by the Examiner

UNITED STATES PATENTS

| | | | |
|---|---|---|---|
| 2,839,541 | 6/1958 | Stevens et al. | 260—279 X |
| 3,121,718 | 2/1964 | Higgins | 260—279 |

OTHER REFERENCES

Albert: The Acridines, Edward Arnold, 151, page 15.

Fieser and Fieser: Advanced Organic Chemistry, Reinhold, 1961, pages 660–61.

Groggins: Chemical Process in Organic Synthesis, 5th edition, McGraw-Hill, 1958.

Belgian Patent 609,423, abstracted in Chem. Abstracts, vol. 57, 1357e (1962).

ALEX MAZEL, *Primary Examiner.*

NICHOLAS S. RIZZO, HENRY R. JILES, *Examiners.*

DONALD G. DAUS, *Assistant Examiner.*